United States Patent
Erb

(10) Patent No.: US 9,699,043 B2
(45) Date of Patent: Jul. 4, 2017

(54) POLICY SERVICE LOGGING USING GRAPH STRUCTURES

(71) Applicant: Netsweeper (Barbados) Inc., St. Michael (BB)

(72) Inventor: Jeremy Erb, Guelph (CA)

(73) Assignee: Netsweeper (Barbados) Inc., St. Michael (BB)

( * ) Notice: Subject to any disclaimer, the term of this patent is extended or adjusted under 35 U.S.C. 154(b) by 0 days.

(21) Appl. No.: 14/401,546

(22) PCT Filed: Oct. 26, 2012

(86) PCT No.: PCT/CA2012/000994
§ 371 (c)(1),
(2) Date: Nov. 17, 2014

(87) PCT Pub. No.: WO2013/177660
PCT Pub. Date: Dec. 5, 2013

(65) Prior Publication Data
US 2015/0120915 A1   Apr. 30, 2015

Related U.S. Application Data

(60) Provisional application No. 61/655,159, filed on Jun. 4, 2012, provisional application No. 61/653,657, filed on May 31, 2012.

(51) Int. Cl.
*H04L 29/06* (2006.01)
*H04L 12/26* (2006.01)
(Continued)

(52) U.S. Cl.
CPC .......... *H04L 43/062* (2013.01); *H04L 41/069* (2013.01); *H04L 41/50* (2013.01);
(Continued)

(58) Field of Classification Search
CPC ...... G06F 3/067; G06F 11/2094; H04L 63/08; H04L 63/10; H04L 63/102; H04L 67/1097
See application file for complete search history.

(56) References Cited

U.S. PATENT DOCUMENTS 5,987,611 A   11/1999   Freund
7,275,104 B1 *  9/2007  Martinez ............... H04L 41/069
                                                      709/218
(Continued)

FOREIGN PATENT DOCUMENTS

EP          2 270 665 A2    1/2011
WO     WO 2013/177660 A1   12/2013
WO     WO 2013/177687 A1   12/2013

OTHER PUBLICATIONS

International Search Report, International Application No. PCT/CA2012/000994, International Filing Date—Oct. 26, 2012, 3 pages.
(Continued)

*Primary Examiner* — Jeong S Park
(74) *Attorney, Agent, or Firm* — Reising Ethington, P.C.

(57) ABSTRACT

A policy service logging system includes one or more servers connected by a network. The one or more servers are configured to provide a graph structure having a plurality of nodes. Each node is in communication with at least one other node. The graph structure is configured to process log entries of network resource requests subject to policy implemented by a policy service. As log entries flow through the graph structure, the nodes perform operations on the log entries.

21 Claims, 11 Drawing Sheets

| LOG ENTRIES 80 | | | | | |
|---|---|---|---|---|---|
| URL 82 | REQUESTOR 83 | USERNAME 84 | GROUP 85 | CATEGORY 86 | POLICY 88 |
| http://www.badsite.com | 172.16.255.1 | rusty | student | malicious | denied |
| http://www.pugilism.com | 208.88.197.162 | tdurden | teacher | violence | allowed |
| http://www.badsite.com | 209.85.231.104 | p.skinner | admin | malicious | allowed |
| ... | ... | ... | ... | ... | ... |
| http://www.goodsite.com | 172.16.255.1 | lilwilson | student | crafts | allowed |

(51) Int. Cl.
*H04L 12/24* (2006.01)
*G06F 3/06* (2006.01)
*H04L 29/08* (2006.01)

(52) U.S. Cl.
CPC .............. *H04L 63/00* (2013.01); *H04L 63/10* (2013.01); *H04L 63/102* (2013.01); *H04L 63/20* (2013.01); *G06F 3/067* (2013.01); *H04L 67/1097* (2013.01)

(56) References Cited

U.S. PATENT DOCUMENTS

| | | | |
|---|---|---|---|
| 8,281,371 B1* | 10/2012 | Chickering | G06F 21/577 709/219 |
| 8,751,598 B1* | 6/2014 | Shankar | H04L 67/1095 707/613 |
| 2002/0069039 A1* | 6/2002 | Ricks | G06F 17/5009 703/1 |
| 2003/0028624 A1 | 2/2003 | Hasan et al. | |
| 2003/0182420 A1 | 9/2003 | Jones et al. | |
| 2004/0107360 A1 | 6/2004 | Herrmann et al. | |
| 2004/0167984 A1 | 8/2004 | Herrmann | |
| 2006/0029016 A1 | 2/2006 | Peles | |
| 2008/0104226 A1* | 5/2008 | Seshasai | G06F 17/3089 709/224 |
| 2008/0141339 A1 | 6/2008 | Gomez et al. | |
| 2008/0229010 A1* | 9/2008 | Maeda | G06F 3/0605 711/113 |
| 2008/0263193 A1* | 10/2008 | Chalemin | G06F 17/30887 709/224 |
| 2008/0276130 A1 | 11/2008 | Almoustafa et al. | |
| 2008/0282338 A1 | 11/2008 | Beer | |
| 2009/0006119 A1* | 1/2009 | Langshur | G06Q 30/02 705/1.1 |
| 2009/0328156 A1* | 12/2009 | Malaviarachchi | G06F 21/6218 726/4 |
| 2011/0145659 A1* | 6/2011 | Ikeyama | G06F 11/3476 714/48 |

OTHER PUBLICATIONS

International Search Report, International Application No. PCT/CA2013/000535, International Filing Date—May 31, 2013, 3 pages.

European Search Report dated Nov. 30, 2015, Application No. 12877719.0-1870/2856701, PCT/CA2012/000994, Applicant: Netsweeper (Barbados) Inc., 5 pages.

* cited by examiner

| POLICY DATABASE 60 | | | |
|---|---|---|---|
| URL 62 | IDENTITY 64 | CAT. 68 | POLICY 66 |
| http://www.badsite.com | student | malicious | deny |
| http://www.badsite.com | teacher | malicious | warn |
| http://www.badsite.com | admin | malicious | allow |
| ... | ... | ... | ... |
| http://www.goodsite.com | student | crafts | allow |

*Fig. 2*

| POLICY DATABASE 70 | | |
|---|---|---|
| KEYWORDS/PHRASES 72 | CAT. 68 | POLICY 66 |
| bad sites | malicious | warn |
| bad web sites | malicious | warn |
| malware | malicious | deny |
| ... | ... | ... |
| fighting movies | violence | warn |

*Fig. 3*

LOG ENTRIES 80

| URL 82 | REQUESTOR 83 | USERNAME 84 | GROUP 85 | CATEGORY 86 | POLICY 88 |
|---|---|---|---|---|---|
| http://www.badsite.com | 172.16.255.1 | rusty | student | malicious | denied |
| http://www.pugilism.com | 208.88.197.162 | tdurden | teacher | violence | allowed |
| http://www.badsite.com | 209.85.231.104 | p.skinner | admin | malicious | allowed |
| ... | ... | ... | ... | ... | ... |
| http://www.goodsite.com | 172.16.255.1 | lilwilson | student | crafts | allowed |

*Fig. 4*

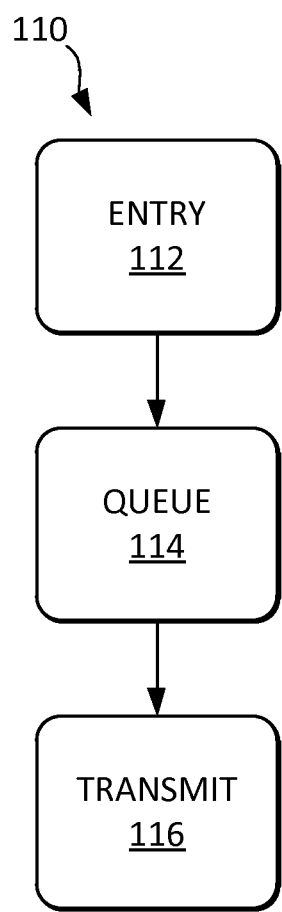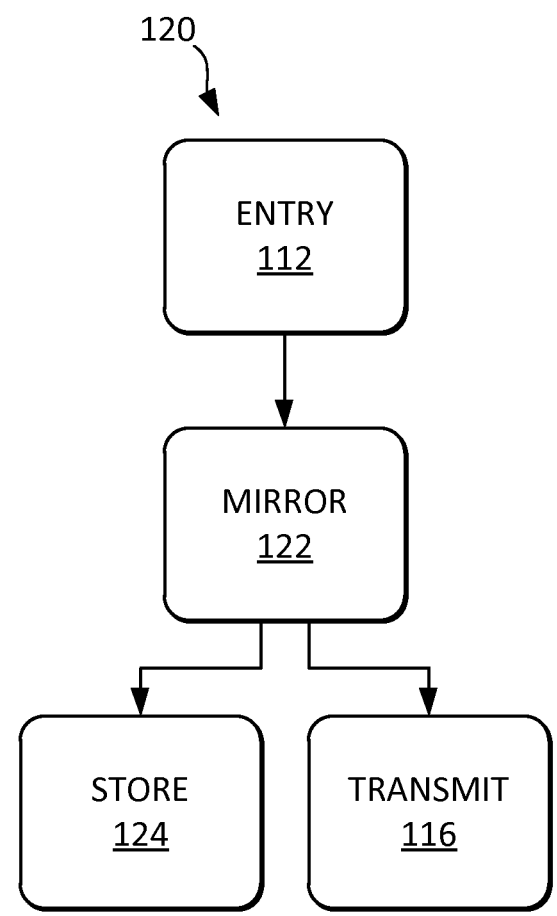
Fig. 7                    Fig. 8

GRAPH STRUCTURE CONFIGURATION FILE 200

NODE INSTANTIATION STATEMENTS 202

```
entry my_entry_point
queue my_temp_queue
transmit my_remote_connection
```

NODE CONNECTION STATEMENTS 204

```
connect my_entry_point my_temp_queue
connect my_temp_queue my_remote_connection
```

NODE SETTING STATEMENTS 206

```
my_temp_que->file_path /tmp/
my_temp_que->file_prefix nsd_temporary_quefile
my_temp_que->max_disk_size 10G
my_temp_que->max_disk_size_thresh 100K
my_temp_que->num_files 10
my_remote_connection->remote_logger_host 192.168.100.99
my_remote_connection->remote_logger_port 3000
```

*Fig. 14*

POLICY SERVICE LOGGING USING GRAPH STRUCTURES

RELATED APPLICATIONS

This application claims priority to U.S. provisional patent application Ser. No. 61/653,657 filed on May 31, 2012, the disclosure of which is incorporated herein by reference. This application also claims priority to U.S. provisional patent application Ser. No. 61/655,159 filed on Jun. 4, 2012, the disclosure of which is also incorporated herein by reference.

TECHNICAL FIELD

This disclosure relates to network policy services, and specifically, to logging requests to network policy services.

BACKGROUND ART

Network policies can be used to prevent undesirable material from being retrieved by a client computer. Such material can include malicious code that detrimentally modifies the behaviour of the retrieving computer or adult-oriented material that is unsuitable for viewing by a child that has access to the computer, to name just a few examples.

Network police services respond to requests for material (e.g., web pages) made by client computers. Logging these requests can aid the operator of a network policy service in understanding the performance of the policy service, potential holes in policy, and the nature of the requests and who is making them.

However, the number of content requests in even a medium-sized network can be vast. Existing methods of logging such requests can fail to log all requests, are typically not easily deployable and configurable, and generally leave much to be desired.

SUMMARY OF INVENTION

A policy service logging system includes one or more servers connected by a network. The one or more servers are configured to provide a graph structure having a plurality of nodes. Each node is in communication with at least one other node. The graph structure is configured to process log entries of network resource requests subject to policy implemented by a policy service. As log entries flow through the graph structure, the nodes perform operations on the log entries.

BRIEF DESCRIPTION OF DRAWINGS

The drawings illustrate, by way of example only, embodiments of the present disclosure.

FIG. 2 is a diagram of a policy service database.
FIG. 3 is a diagram of another policy service database.
FIG. 4 is a diagram of policy service request log entries.
FIG. 7 is a diagram of an example graph structure for queuing and transmitting log entries.
FIG. 8 is a diagram of an example graph structure for copying, storing, and transmitting log entries.
FIG. 14 schematic diagram of a graph structure configuration file.

DESCRIPTION OF EMBODIMENTS

Figure 1:
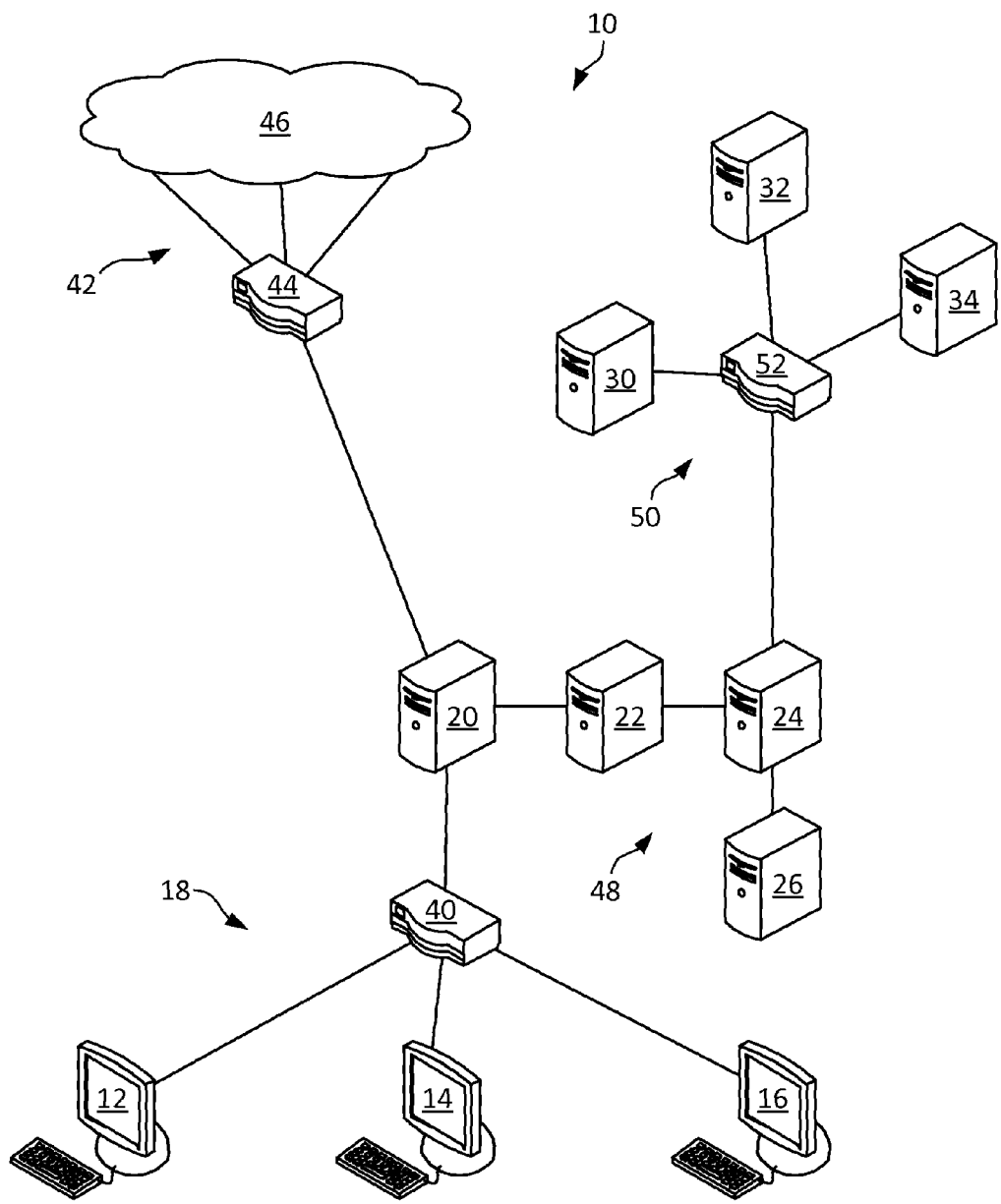
FIG. 1 is a diagram of a networked computer system.

FIG. 1 is a diagram illustrating a computer system 10, in accordance with an embodiment of this disclosure.

The computer system 10 can include multiple client computers 12, 14, 16, a network 18, a gateway server 20, an interceptor server 22, a policy server 24, a message server 26, and log servers 30, 32, 34.

The network 18 connects the client computers 12, 14, 16 to the gateway server 20. Such a network 18 may include network devices such as hubs, routers, network cables, wireless access points, fiber-optic lines, and the like, as generally indicated at 40. In one example, the network 18 may be a private intranet under the control and administration of an organization such as a corporation or institution, with the client computers 12, 14, 16 being workstations exclusively used by individuals belonging to such organization. In another example, the network 18 may be accessible to client computers under the control and administration of different organizations, and as such the network 18 may be a public or semi-public network. That is, the gateway server 20 may be accessible to the client computers 12, 14, 16 using login credentials over a public network, such as the Internet. Irrespective of the specific structure of the network 18, the network 18 provides for data communication between the client computers 12, 14, 16 and the gateway server 20.

The client computers 12, 14, 16 may each be a computer such as a desktop computer, notebook computer, tablet computer, smart phone, netbook, video game or entertainment console, and the like.

The gateway server 20 connects the network 18, and thus the client computers 12, 14, 16, to a content network, generally indicated at 42. The content network 42 includes a plurality of routers and other network devices, generally represented at 44, that provides for data communication between the gateway server 20 and sources of content, generally shown at 46. The gateway server 20 may further include additional network devices such as hubs, routers, network cables, wireless access points, fiber-optic lines, and the like, but these are omitted from the figure for clarity and will not be discussed in detail. The network 42 can be the Internet.

Content resources 46 accessible to the client computers 12, 14, 16 via the gateway server 20 include web servers, file transfer protocol (FTP) servers, streaming media servers, and the like. As such the content available includes web pages, files, streaming video and audio, and similar content.

The interceptor server 22, policy server 24, message server 26, and log server 28 may form a policy service network 48 or policy service, which may include network devices such as hubs, routers, network cables, wireless access points, fiber-optic lines, and the like, which are omitted from the figure for clarity. In some embodiments, the gateway server 20 forms part of the policy service network 48. In some embodiments, policy service network 48 may serve any of multiple different content-consumer networks 18 and multiple different content-source networks 42.

The log servers 30, 32, 34 form a logging system that will be discussed in greater detail below. The log servers 30, 32, 34 communicate over a logging network 50 that can include a plurality of routers and other network devices, generally represented at 52, that provides for data communication between the policy service network 48 at the logging network 50. In some embodiments, the policy service network 48 and the logging network 50 are the same network and the one or more log servers 30, 32, 34 are connected to the policy server 24.

In some embodiments, any two or more of the networks 18, 42, 48, 50 may be part of the same larger network, such as the Internet. In some embodiments, the networks 18, 48, 50 are part of an organisation's (e.g., a business or school system) wide-area network.

The gateway server 20 is configured to receive content requests from the client computers 12, 14, 16 to access web sites or other resources 46 accessible via the content network 42. The gateway server 20 is further configured to either explicitly redirect content requests to the interceptor server 22 in the form of access requests or to transparently copy the content requests to the interceptor server 22 in the form of outbound access requests.

Any given content request can include a network location of the requested content, such as a requested uniform resource locator (URL), that has had an associated link clicked, has been typed in, or has otherwise been selected via a web browser, or other user agent, at the requesting client computer 12, 14, 16. Content requests can additionally or alternatively include information submitted by the client computers 12, 14, 16 using a request method, such as the (hypertext transfer protocol) HTTP POST method, the HTTP GET method, or similar. Such information can include search keywords/phrases provided that are to be provided to a search engine to carry out a search.

The interceptor server 22 is configured to authenticate the requesting client computer 12, 14, 16 based on access credentials associated with the requesting client computer 12, 14, 16. The access credentials may be an IP address of the requesting computer 12, 14, 16, a username and password combination entered by a user of the requesting computer 12, 14, 16, or similar. The access credentials can form the basis of an identity of the user of the requesting computer 12, 14, 16.

The interceptor server 22 is further configured to verify the access credentials by matching them with pre-stored verification information, such as IP addresses, encrypted or hashed version of passwords, or similar. The interceptor server 22 may maintain a database of such verification information in association with identifying information of users of the client computers 12, 14, 16, including any of organizational information, such organizational role and job title; demographic information, such sex, location, ethnicity, and age; and personal information, such as name, date of birth, employee number, student identification number, and the like. The interceptor server 22 can thus use the access credentials originating from the requesting computer 12, 14, 16 to determine the identity of the user of the requesting computer 12, 14, 16. In some embodiments, the access credentials themselves may be taken as the identity.

The identity may be reasonably unique to the user, such as name or identification number, or may be a broader group-based characteristic, such as the user's age group or sex. The identity may include a combination of several characteristics, such as age and organizational role (e.g., minor student, student at age of majority, and teacher).

If the requesting computer 12, 14, 16 is authenticated, the interceptor server 22 sends a policy request that includes the determined user identity along with the content request to the policy server 24. Identities, and particularly group-based identities, are discussed in WO2011/004258, which is incorporated herein by reference.

The policy server 24 is configured to determine whether a restrictive policy applies to the requested content. Restrictive policy may be based on the identity of the user and the requested content or may be based on the requested content without regard to the identity of the user (e.g., all users are subject to the same policy). In some embodiments, the policy server 24 stores a policy database 60 that associates URLs 62 and identities 64 to policies 66, as shown in FIG. 2. In addition, URLs 62 may be organized into content categories 68, so that policies can be applied or requests can be logged based on content classification. In other embodiments, a policy database 70 associates search keywords/phrases 72 to policies 66, as shown in FIG. 3. This allows fine-grained application of policy to content located at different URLs or content associated with certain search keywords/phases.

The requested URL or keywords/phrases and identity, if used, received from the interception server 22 is then used in a database query to obtain any resulting policy. When no restrictive policy applies, the policy server 24 can be configured to indicate such to the interception server 22, which is configured to indicate to the gateway server 20 that the content request is not subject to restrictive policy and can be handled normally, as requests for and responses of content.

Polices can be based on individual users or can group-based, such as also described in WO2011/004258. The policy server 24 is configured to send a policy output, which identifies the requested URL or search keyword/phrase, to the message server 26.

The message server 26 is configured to construct a policy message in response to the policy output. For policy decisions that deny access to the requested content or that warn a user about the requested content, the policy message can refer to a landing page.

The policy server 24 is configured to forward the landing page location to the gateway server 20, which is configured to provide the landing page location in response to the content request. This may be achieved by the policy server 24 sending an HTTP 402 response to gateway server 20 with the landing page location contained in the header of the HTTP 402 response.

When the requesting computer 12, 14, 16 receives the landing page location in response to the content request, the requesting computer 12, 14, 16 displays the landing page in its web browser or other user agent. As a result, when the content request is governed by restrictive policy, the user of the client computer 12, 14, 16 that made the content request is shown a landing page that contains an indication of the policy decision, such as a text informing the user of a deny decision or a warning with a request for confirmation to proceed to the content.

The policy server 24 may further be configured to send log entries of policy requests to the logging network 50, which is configured to process and store log entries for future reference. As shown in FIG. 4, log entries 80 may include an indication of the requested content 82, such as a URL, a requesting computer's network address 83 (e.g., IP address), the requesting user's username 84, the identity of a group 85 associated with the user of the requesting computer, the content category 86, and the policy decision 88 made by the policy service 48.

Figure 5:
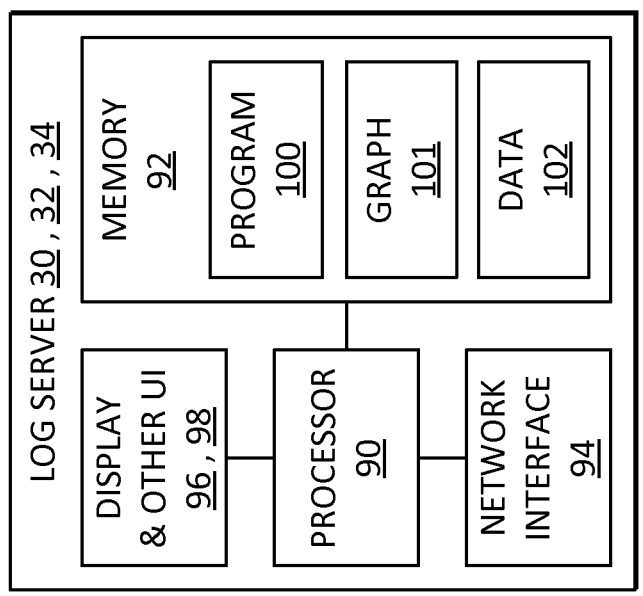
FIG. 5 is a functional block diagram of a log server.

FIG. 5 shows an example computer that can be used as any of the log servers 30, 32, 34. It should be noted that three log servers 30, 32, 34 are described as an example only. More or fewer log servers can be used. Functionality described herein with respect to several servers can be performed by fewer servers or even a single server, with any associated communications between physical servers described herein being configured instead as communications between processes or being subsumed.

Each server can include a processor 90, memory 92, a network interface 94, and can further include a display 96 and other user interface components 98. The processor 90, memory 92, network interface 94, and display 96 and other user interface 98 are electrically interconnected and can be physically contained within a housing or frame. The server may be computer such as a rack-mount server, blade server, tower server, or another kind of computer, or a process or program running on such a computer.

The processor 90 is configured to execute instructions, which may originate from the memory 92 or the network interface 94. The processor 90 may be known a central processing unit (CPU). The processor 90 can include one or more sub-processors or processing cores.

The memory 92 includes a non-transitory computer-readable medium that is configured to store programs and data. The memory 92 can include one or more short-term or long-term storage devices, such as a solid-state memory chip (e.g., DRAM, ROM, non-volatile flash memory), a hard drive, an optical storage disc, and similar. The memory 92 can include fixed components that are not physically removable from the server (e.g., fixed hard drives) as well as removable components (e.g., removable memory cards). The memory 92 allows for random access, in that programs and data may be both read and written.

The network interface 94 is configured to allow the server to communicate with other computers across a network. The network interface 94 can include one or more of a wired and wireless network adaptor and well as a software or firmware driver for controlling such adaptor.

The display 96 and other user interface components 98, if provided, can include a display device, such as a monitor, a bank of light-emitting diodes (LEDs), or similar for monitoring operations of the server. The user interface 98 can include an input device, such as a keyboard, mouse, touch-sensitive element of a touch-screen display, or similar device. The user interface 98 can be remote to the server and provided via the network interface 94 to a client computer operated by a remote administrator. The user interface 98 can include a graphical user interface.

Although the servers 30, 32, 34 may have similar components, as described above, each server 30, 32, 34 may be configured in a manner selected for its specific logging operations as described elsewhere herein. For example, a server 30, 32, 34 that is configured to store large amounts of log entries may be provided with high storage capacity (e.g., much long-term memory, such as high-capacity hard drives), while another server 30, 32, 34 that is configured to route log entries for later storage may be provided with high processing speed (e.g., multiple advanced processors 90).

Each of the servers 30, 32, 34 can include one or more programs 100 that implement one or more graph structures 101 that carry out the operations described herein. Graph structures 101 may reference data 102, such as configuration files and log entries, which can be stored in files, databases, or other data structures.

Figure 6:
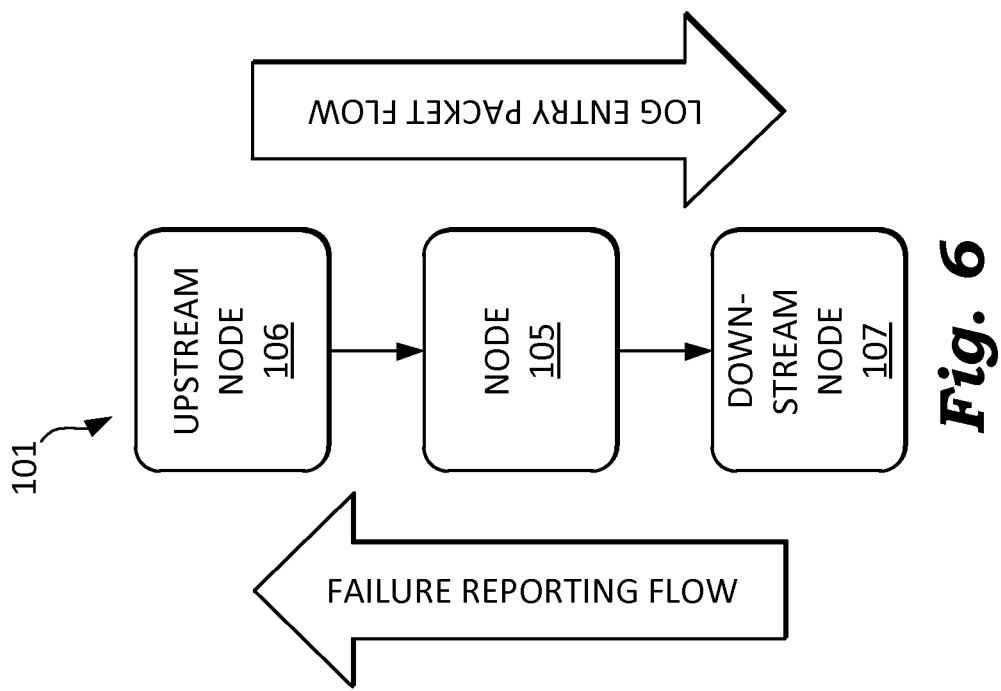
FIG. 6 is a diagram of a general graph structure of nodes.

With reference to FIG. 6, at least one of the log servers 30, 32, 34 is configured to provide one or more graph structures 101 that each includes a plurality of nodes 105, 106, 107, with three nodes being illustrated as an example. Each node is in communication with at least one other node. The graph structure 101 is configured to process log entries of network resource requests subject to policy implemented by the policy service 48. The nodes 105, 106, 107 are configured to perform operations on the log entries, and such operations can include storing, queuing, transmitting to a remote node, failover routing between nodes, discarding, mirroring, load balancing, scheduling, hashing, filtering, among others.

A node 105, 106, 107 defines a discrete element of operational behaviour. The graph structure 101 is selectably configured of a plurality of connected nodes and thus provides more complex and customizable operational behaviour. The configurable nodes and graph structures described herein thus define a customizable and modular framework that can be used to advantageously establish logging systems according to different needs.

The connections between nodes are one-way in that information (e.g., packets) flows in one direction, downstream. Nodes and graph structures can be instantiated from predetermined types. Different instances of the same type of node can be used in the same graph structure.

Information flowing through the graph structure 101 can take the form of packets. In some embodiments, log entries are queued and accumulated and then bundled into a packet. Depending on the queuing and accumulation logic employed, a packet may have one log entry. However, each packet generally has a plurality of log entries.

Nodes are of three types: graph starting points, graph intermediate points, and graph endpoints. Packets enter a graph structure at a graph starting point, namely, an entry node.

From the entry node, packets move downstream through intermediate points, which are configured to perform operations that route packets, copy packets, split packets into smaller packets, queue packets, and the like. Intermediate points are optional, and a simple graph structure may only have an entry node and an endpoint node.

Graph endpoints are nodes that end processing of a packet of log entries for a particular graph structure. These nodes are configured to transmit packets over a network, store log entries of packets in long-term storage, discard packets, generate aggregated data derived from log entries, and similar.

When a packet contains multiple log entries, it is possible for the packet to be partially processed by a node. This means that some of a packet's log entries are successfully processed (e.g., sent to a remote server), while other log entries are not (e.g., because there was a failure after the first portion of the packet was sent). Nodes can be configured for partial processing, which allows a node to take over processing of a packet's log entries by only handling log entries that have not yet been processed. Partial processing can ensure that all entries get processed once, with little to no duplication of log entries and little to no loss of log entries.

When a packet reaches an endpoint node that, for example, is configured to store log entries for the long-term, the log entries contained in the packed are unbundled and stored as distinct log entries.

While flow of packetized log entries is downstream, nodes report failure upstream. Nodes can have different states of failure. A node can undergo packet failure and node failure, which are independent of each other.

Regarding packet failure, as a packet travels downstream through the graph structure 101, each node 105 along the way can return either a failure or a success for the packet, or can send the packet to the downstream neighbouring node 107 and so that a downstream node can return either a failure or a success for the packet. When a node issues a packet failure or packet success, each node upstream can (in reverse order) react accordingly. Nodes 105 can be configured to not perform any operation in reaction to a packet success issued by the downstream neighbouring node 107. Nodes 105 can be configured to perform operations in reaction to a packet failure issued by the downstream neighbouring node 107.

Many of the nodes described herein have a node failure state. The node failure state typically indicates a temporary condition that prevents a node from handling any further packets. Such a temporary condition can include loss or congestion of a network connection, filling of a queue, and so on, as will be discussed below.

Various types of nodes will now be described with reference to example graph structures. It should be noted that graph structures are configurable from the building block-like nodes and, accordingly, these examples are merely illustrative. As with any of the graph structures described herein, each of the example graph structures can be implemented on one of the log servers 30, 32, 34.

FIG. 7 shows an example graph structure 110 made up of a plurality of nodes. The graph structure 110 is configured to receive, queue, and then transmit packets of log entries.

The graph structure 110 includes instances of an entry node 112, a queue node 114, and a transmit node 116.

The entry node 112 is the starting point of the graph structure 110.

Downstream of the entry node 112 is the queue node 114, which is configured to queue packets of log entries. Queuing packets can be advantageous when a downstream node goes offline or is otherwise unavailable to accept packets. The queue node 114 is configured receive packets from one or more upstream nodes and send packets to the downstream node when the downstream node is available. The queue node 114 is configured to store packets when the downstream node is unavailable (i.e., under failure), and resume sending packets to the downstream node when the downstream node becomes available. The queue node 114 operates according to a first-in, first-out (FIFO) principle.

The queue node 114 stores packets of log entries to a storage device, such as a hard drive. Accordingly, the queue node 114 can be instantiated with settings such as the path for the file or files, a naming convention for the file or files, memory buffer sizes when writing to or reading from disk, a maximum disk size (e.g., 1 TB), a threshold below the maximum disk size at which the queue node 114 will stop accepting packets, and a number of files to use when storing packets of log entries.

The queue node 114 is configured to report a packet failure when it cannot write a packet to the queue or when the downstream node reports a packet failure. The queue node 114 enters a node failure state when the maximum disk size is reached (within the threshold, if set).

An instance of a queue node 114 can have any number of upstream nodes and can have only one downstream node. In this example, this instance of the queue node 114 depicted has one upstream node and one downstream node.

Downstream of the queue node 114 is the transmit node 116, which is configured to transmit packets of log entries to a remote host, such as another of the servers 30, 32, 34. The transmit node 116 uses a suitable protocol, such TCP/IP, to transmit packets to the remote host over the logging network 50 (FIG. 1).

The transmit node 116 is configured to receive packets from one or more upstream nodes and send packets to a remote host while taking into account network conditions, such as the remote host being temporarily unreachable or not providing acknowledgements, network congestion, the remote host dropping the connection, and the like. The transmit node 116 has a transmit buffer and is configured to continuously attempt to keep its connection and to attempt to reconnect automatically any time its connection is lost. To signify network problems to upstream nodes, the transmit node 116 can enter node failure state. The transmit node 116 can also indicate a packet failure when a packet cannot be sent to the remote host.

The transmit node 116 can be instantiated with settings, such a network address of the remote host (e.g., hostname or IP address), a port at which to connect to the remote host, a size for the transmit buffer (e.g., 5 MB), remote host timeout and count of past timeouts before the connection to the remote host is considered stalled and is disconnected and then reconnected, a keep-alive time indicating how long the connection is to be idle before keep-alives will be sent, a maximum number of consecutive unacknowledged keep-alives to allow before the connection will be disconnected and then reconnected, and a time to pause between attempts to reconnect to the remote server.

In addition, the transmit node 116 can be instantiated, by way of further settings, to adopt certain behaviour when the transmit buffer becomes full. The default behaviour is for the transmit node 116 to enter the node failure state so that upstream nodes can queue or failover. However, the transmit node 116 can be configured to instead block transmission of packets until the connection is restored.

The transmit node 116 is configured to not be connectable to a downstream node in a graph structure, and is accordingly an endpoint of any graph structure incorporating it.

FIG. 8 shows an example graph structure 120 made up of a plurality of nodes. The graph structure 120 is configured to receive, mirror, and then store and transmit packets of log entries.

The graph structure 110 includes instances of an entry node 112, a mirror node 122, a store node 124, and a transmit node 116.

The entry node 112 and transmit node 116 are as described above.

Downstream of the entry node 112 is the mirror node 122. The mirror node 122 is configured to copy received packets of log entries to each of its multiple downstream neighbour nodes. This can advantageously provide for redundancy by allowing multiple copies of log entries to be stored on different log servers 30, 32, 34 or in different files on the same log server 30, 32, 34. The mirror node 122 can have any number of one or more upstream neighbours and any number of one or more downstream neighbours.

The mirror node 122 can be configured, by way of settings, to not copy packets to a downstream neighbour that reports a node failure (e.g., is offline) and issue a packet failure to its upstream neighbour, to stop mirroring packets as soon as any downstream node cannot be sent packets and issue a packet failure to its upstream node, or to only report a packet failure when no downstream neighbour can be sent packets.

The mirror node 122 is configured to enter node failure state when all of its downstream neighbours report node failure.

Downstream of the mirror node 122 is the transmit node 116, discussed above, and the store node 124.

The store node 124 is configured to extract log entries from packets and write such log entries to long-term storage, such as hard drive, magnetic tape, or optical medium. The store node 124 achieves the policy request logging purpose of the logging network 50 (FIG. 1). Log entries stored by the store node 124 are stored in files on the log server 30, 32, 34 that implements the store node 124. Such files can be automatically named according to a naming convention and filenames can include date and time stamps.

The store node 124 can be instantiated with settings that can set a maximum total size for all log files, set the maximum size for each log file, specify a number of log files to use, specify a delay after which to flush the contents of a memory log buffer to long-term storage, select a format for log files (e.g., binary, text, extended binary), and select to log a network address of the server from which a log entries are received.

The store node 124 is an endpoint node and cannot have a downstream neighbour node. The store node 124 can have any number of upstream neighbour nodes.

The store node 124 is configured to not report any packet or node failures and will always report as operational and as successfully storing packets.

Thus, the graph structure 120 copies received packets at the mirror node 122 to the store node 124 and the transmit node 116. The store node 124 stores the log entries in the packets in long-term storage, while the transmit node 116 sends copies of the same packets to a remote host, which can, for example, redundantly store the log entries.

Figure 9:
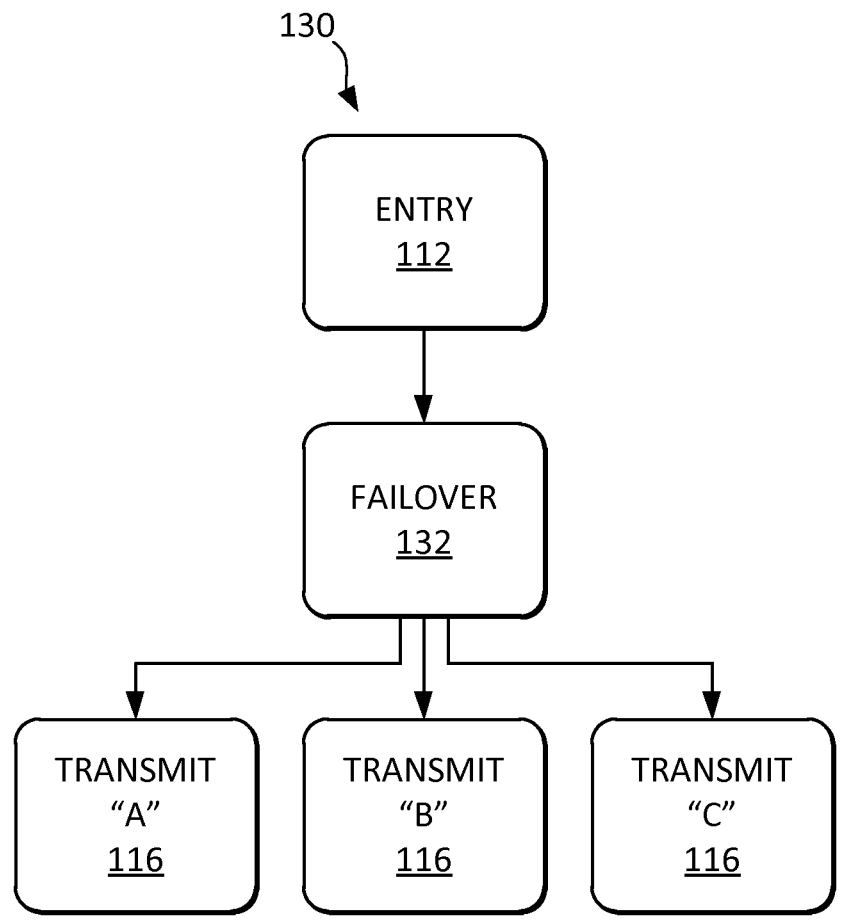
FIG. 9 is a diagram of an example graph structure for transmitting log entries according to a failover methodology.

FIG. 9 shows an example graph structure 130 made up of a plurality of nodes. The graph structure 130 is configured to receive, failover route, and then transmit packets of log entries.

The graph structure 130 includes instances of an entry node 112, a failover node 132, and several transmit nodes 116.

The entry node 112 is as described above.

Downstream of the entry node 112 is the failover node 132.

The failover node 132 is configured to route packets of log entries to the highest priority downstream neighbouring node that is available (i.e., not reporting a node failure). When determining to which downstream node to send a packet, the failover node 132 is configured to check whether the highest priority node is available and, if not available, check the next highest priority node, and so on. If a high priority node becomes available after a time during which it was unavailable, the failover node 132 will determine this the next time failover node 132 checks downstream node availability and priority.

The priority of downstream nodes can be selected in several ways. In some embodiments, the priority of a downstream node is determined by the order in which it was added to the graph structure. For example, the downstream node that is first connected to the failover node 132 is assigned the higher priority. Each subsequent downstream node connected to the failover node 132 is given a lower priority. Order can be determined by the listing of node connections in a configuration file (FIG. 14). In other embodiments, downstream node priority can be user-specified in a setting of the failover node 132 or in settings of the downstream nodes.

The failover node 132 also automatically handles temporary failures. The failover node 132 is configured to automatically attempt to send a packet to the next highest priority downstream neighbor node when the currently attempted downstream neighbour node fails to accept the packet.

The failover node 132 is configured to report a packet failure when all downstream neighbouring nodes are unavailable or report a packet failure on the same packet. The failover node 132 is configured to report a node failure when all downstream neighbouring nodes report node failures.

The failover node 132 can have one or more upstream neighbour nodes and can have multiple downstream neighbour nodes.

Each of the transmit nodes 116 is as described above. However, in the graph structure 130, three instances of the transmit node 116 are instantiated for three different remote servers. One instance connects to a remote server "A", another instance connects to a remote server "B", and the third instance connects to a remote server "C".

The graph structure 130 thus receives packets of log entries and routes them for transmission according to the priorities of the instances of the transmit node 116. In one example, the priorities are configured such that the failover node 132 first attempts to route packets to the transmit node 116 instantiated for remote server "A", and then tries to route packets to the transmit node 116 instantiated for remote server "B", before finally attempting to route packets to the transmit node 116 instantiated for remote server "C".

Figures 10, 11:
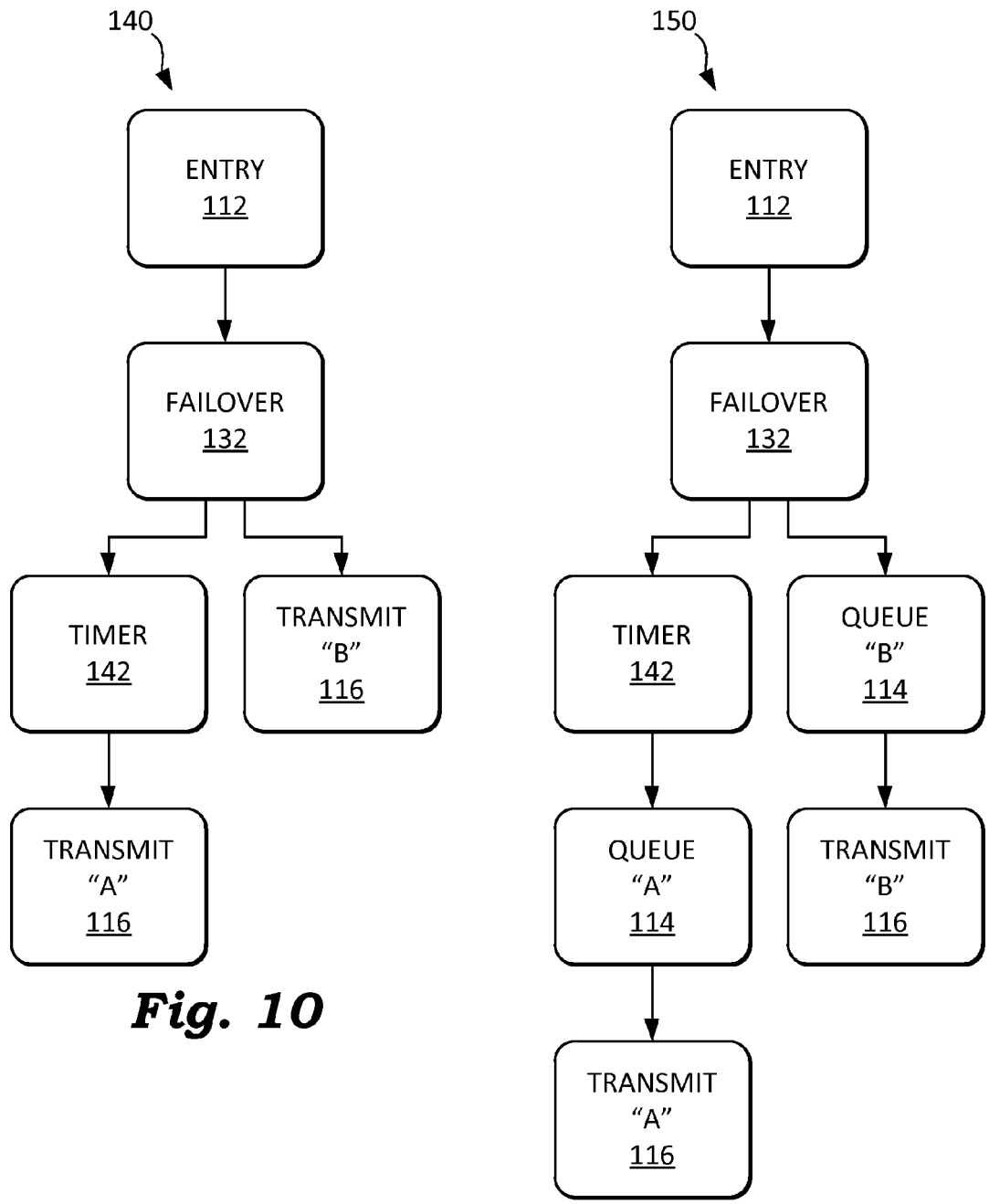
FIG. 10 is a diagram of an example graph structure for transmitting log entries based on a time window.
FIG. 11 is a diagram of an example graph structure for queuing and transmitting log entries based on a time window.

FIG. 10 shows an example graph structure 140 made up of a plurality of nodes. The graph structure 140 is configured to receive, failover route, and then reference a timer when transmitting packets of log entries.

The graph structure 140 includes instances of an entry node 112, a failover node 132, a timer node 142, and several transmit nodes 116.

The entry node 112 is as described above. Downstream of the entry node 112 is the failover node 132, also as described above. One of the downstream neighbouring nodes of the failover node 132 is an instance of a transmit node 116, as described above, configured to transmit packets to a remote server "B". Another of the downstream neighbouring nodes of the failover node 132 is a timer node 142.

The timer node 142 is configured to report node failure outside of one or more selected windows of time of day. This causes an upstream neighbouring node to respond differently depending on the time. When the timer node 142 does not report failure (i.e., inside a selected window of time), the timer node 142 forward packets received from the upstream neighbouring node to the downstream neighbouring node. When the timer node 142 reports failure (i.e., outside the selected window of time), the upstream neighbouring node operates as if the timer node 142 were any type of failed node.

A timer node 142 instance can be configured by a setting that establishes the one or more selected windows of time. The setting can be effected by a string that contains one or more windows of time. Examples of such a string include "10:00 16:00" (one window of 10 AM to 4 PM) and "10:00 16:00; 22:00 24:00" (one window of 10 AM to 4 PM and another window of 10 PM to midnight).

The timer node 142 can be configured, for example, to cause log entries to be transmitted to a remote server late at night (i.e., inside the selected window of time) when greater bandwidth is available and to be queued by a queue node placed directly upstream of the timer node 142 during the day (i.e., outside the selected window of time).

The timer node 142 can have multiple upstream nodes but only one downstream node.

The timer node 142 is configured to report a packet failure if the downstream node reports a packet failure. The timer node 142 will also report a packet failure if packets are sent to it when in the node failure state. The timer node 142 is configured to enter the node failure state when outside the selected window(s) of time or if its downstream neighbouring node reports a node failure.

Downstream of the timer node 142 is an instance of a transmit node 116, as described above, configured to transmit packets to a remote server "A".

Thus, the graph structure 140 of FIG. 10 results in packets of log entries tending to be sent to the remote server "A" within the window of time selected for the instance of the timer node 142, which is set to a higher priority from the perspective of the failover node 132. Outside the window of time selected for the instance of the timer node 142, packets of log entries are sent to the remote server "B". Control of packet routing is achieved by the failover node 132, which operates on priority of the downstream neighbouring nodes and responds to any node failures issued by the timer node 142 or the instance of the transmit node 116 designating remote server "B". Thus, if the server "A" transmit node 116 reports a node failure (e.g., the remote server "A" goes down) within the window of time of the timer node 142, packets will be routed to the server "B" transmit node 116.

FIG. 11 shows an example graph structure 150 made up of a plurality of nodes. The graph structure 150 is configured to receive, failover route, and then reference a timer before queuing packets of log entries for transmission.

The graph structure 150 includes instances of an entry node 112, a failover node 132, a timer node 142, several queue nodes 114, and several transmit nodes 116. These nodes operate as described above.

Operation of the graph structure 150 is similar to that of the graph structure 140 described above. However, the queue nodes 114 are located directly upstream of the transmit nodes 116 to increase the likelihood that the timer will completely govern which remote server "A" or "B" stores log entries. That is, if the server "A" transmit node 116 reports a node failure (e.g., the remote server "A" goes down) within the window of time set for the timer node 142, packets will be queued at the queue node 114 directly downstream of the timer node 142 instead of the failover node 132 immediately routing packets to the server "B" transmit node 116. The failover node 132 would only route packets to the server "B" transmit node 116 during the window of time set for the timer node 142 after queue "B" becomes full.

Figure 12:
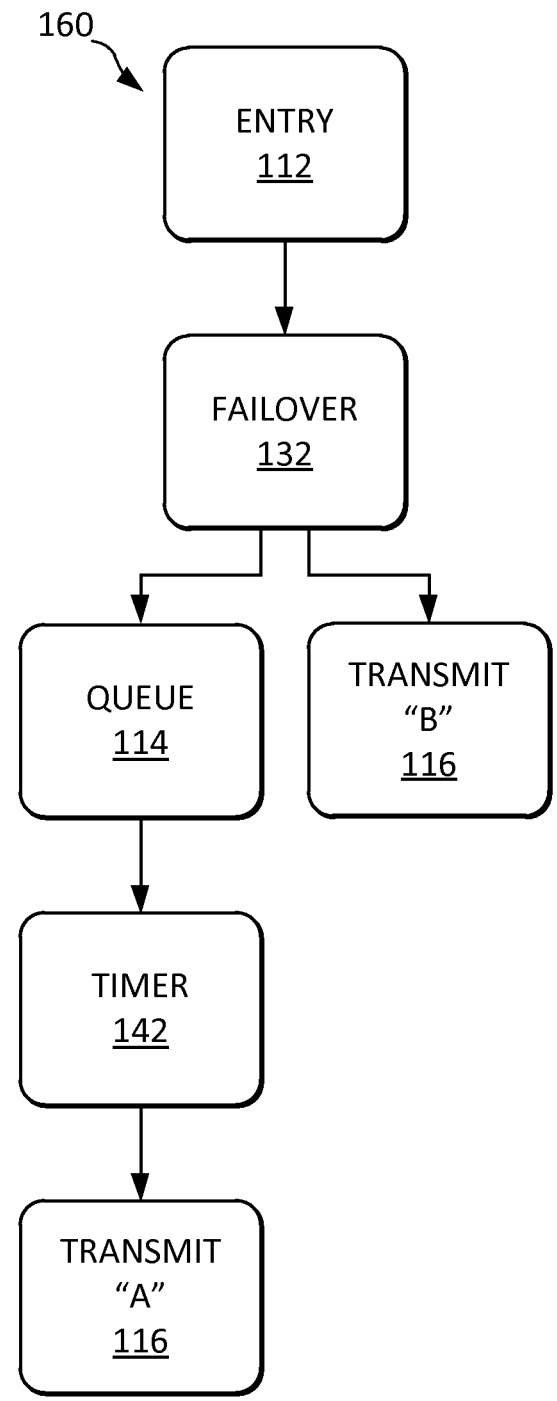
FIG. 12 is a diagram of another example graph structure for queuing and transmitting log entries based on a time window.

FIG. 12 shows an example graph structure 160 made up of a plurality of nodes. The graph structure 160 is configured to receive, failover route, and queue packets of log entries for transmission according to a timer.

The graph structure 160 includes instances of an entry node 112, a failover node 132, a queue node 114, a timer node 142, and several transmit nodes 116. These nodes operate as described above.

Operation of the graph structure 160 is similar to that of the graph structure 150 described above. However, because the queue node 114 is directly upstream of the timer node 142 and has a higher priority than the instance of the transmit node 116 designating the remote server "B", packets are queued at the queue node 114 outside the selected window of time of the timer 142. During the selected window of time, packets are transmitted from the queue node 114 to remote server "A". Thus, remote server "B" acts as a backup if the queue fills or if remote server "A" goes down for an extended period of time.

Additional types of nodes will now be described.

A split node is configured to split each received packet into two or more smaller packets that are then sent to different respective downstream nodes. The split node is configured to respond to a setting that indicates the number of smaller packets into which a received packet is to be divided. This setting may be automatically selected based on the number of downstream connections to the split node.

The split node can have one or more upstream neighbouring nodes and two or more downstream neighbouring nodes.

The split node reports a packet failure if any of the downstream neighbouring nodes report a packet failure. The split node enters a failure state when any of its downstream neighbouring nodes is offline (i.e., reports a node failure).

A load balancing by size node is configured to route packets to downstream neighbouring nodes based on a tracked history of packets that have been sent to each downstream neighbouring node. Thus, the load balancing by size node tends to send packets to downstream nodes that would be expected to have more resources available. In one example, the load balancing by size node tracks a running total size of a past selected number of packets (e.g., 100) sent to each downstream neighbouring node and sends the next packet to the downstream neighbouring node that has the lowest running total size. If the selected downstream node reports a packet failure, then the load balancing by size node selects the downstream node with the next lowest running total size.

The load balancing by size node reports a packet failure if all the downstream neighbouring nodes report a packet failure. The load balancing by size node enters a failure state when any of its downstream neighbouring nodes is offline (i.e., reports a node failure).

The load balancing by size node can have one or more upstream neighbouring nodes and one or more downstream neighbouring nodes.

A load balancing by round-robin node is configured to route packets to a next one of several downstream neighbouring nodes, as all the downstream neighbouring nodes are cycled through. If the selected downstream node reports a packet failure, then the load balancing by round-robin node selects the next downstream node in the cycle.

The load balancing by round-robin node reports a packet failure if all the downstream neighbouring nodes report a packet failure. The load balancing by round-robin node enters a failure state when any of its downstream neighbouring nodes is offline (i.e., reports a node failure).

The load balancing by round-robin node can have one or more upstream neighbouring nodes and one or more downstream neighbouring nodes.

A group hash node is configured divert log entries to different downstream neighbouring nodes depending on the group identifiers 85 (FIG. 4) of the log entries. A hash function that converts the string defining the group to a power-of-two value (i.e., 1, 2, 4, 8, 16, etc.) can be employed. Thus, all log entries of a particular group (e.g., "student") will be routed to the same downstream neighbouring node. When the downstream neighbouring node is a store node, all log entries for a particular group can be stored on the same server 30, 32, 34.

Hashing can help optimize or speed generation of group-related reports. Specifically, it allows the optimization of reports that group by the group field or that search for a specific group.

The group hash node is configured to report a packet failure if the downstream neighbouring node selected by the hash reports a packet failure. The group hash node is configured to report a node failure if any of its downstream neighbouring nodes reports a node failure.

The group hash node has at least one upstream neighbouring node and has a power-of-two number of downstream neighbouring nodes, which allows for efficient and fast hashing across downstream neighbouring nodes.

An IP address hash node is configured divert log entries to different downstream neighbouring nodes depending on requesting computers' IP addresses 83 (FIG. 4) of the log entries. In other respects, the IP address hash node is the same as the group hash node.

A username hash node is configured divert log entries to different downstream neighbouring nodes depending on the usernames 84 (FIG. 4) associated with requests in the log entries. In other respects, the username hash node is the same as the group hash node.

A denied hash node is configured divert log entries to different downstream neighbouring nodes depending on the policy decisions 88 (FIG. 4) made for the requests in the log entries. In this embodiment, the policy decisions are "denied" and "allowed", and accordingly, the denied hash node requires two downstream neighbouring nodes. In other respects, the denied hash node is the same as the group hash node.

A URL hash node is configured divert log entries to different downstream neighbouring nodes depending on the requested URLs 82 (FIG. 4) in the log entries. In other respects, the URL hash node is the same as the group hash node.

A hash combo node combines the functionality of the above-described hash nodes and the store node. The hash combo node is configured to selectably apply any of the hash operations with a selectable number of log entry storage files. The hash combo node advantageously allows simplified setup of any type of hash node with storage. A hash combo node is configured by settings that specify the type of hash (e.g., group, IP address; see above) and the number of log files to use, which is a power-of-two number.

The hash combo node is configured to not report packet failures and always reports success. The hash combo node does not have a node failure state and will always report as operational.

The hash combo node has one upstream neighbouring node and has no downstream neighbouring nodes.

A group filter node is configured divert log entries to different downstream neighbouring nodes depending on the group identifiers 85 (FIG. 4) of the log entries. A filter string that is compared to the group identifier 85 can be employed. Log entries matching the filter (e.g., "student") are routed to the highest priority downstream neighbouring node. Log entries that do not match the filter are routed to another downstream neighbouring node. If another downstream neighbouring node is not connected, then log entries that do not match the filter are discarded.

The group filter node is configured to not report packet failures and always reports success. The group filter node does not have a node failure state and will always report as operational.

The group filter node has at least one upstream neighbouring node and has one or two downstream neighbouring nodes.

An IP filter node is configured filter log entries to different downstream neighbouring nodes depending on requesting computers' IP addresses 83 (FIG. 4) of the log entries. In other respects, the IP address filter node is the same as the group filter node.

A username filter node is configured divert log entries to different downstream neighbouring nodes depending on the usernames 84 (FIG. 4) associated with requests in the log entries. In other respects, the username filter node is the same as the group filter node.

A denied filter node is configured divert log entries to different downstream neighbouring nodes depending on the policy decisions 88 (FIG. 4) made for the requests in the log entries. In this embodiment, the policy decisions are "denied" and "allowed", which are filter strings that can be used to configure the denied filter node. In other respects, the denied filter node is the same as the group filter node.

A URL filter node is configured divert log entries to different downstream neighbouring nodes depending on the requested URLs 82 (FIG. 4) in the log entries. The filter string can be configured as a URL, which is compared to the same number of characters of the requested URLs 82, beginning from the left. That is, "http://www.badsite.com/" will match "http://www.badsite.com/" and "http://www.badsite.com/main.htm". In other respects, the URL filter node is the same as the group filter node.

An aggregate node is configured to generate aggregate data concerning received packets and store such data to long-term storage. The aggregate node can be configured to operate on any one or more fields 82-88 of the log entry data (FIG. 4). In some embodiments, the aggregate node is configured to record a running count of log entries that meet criteria specified in a setting. The setting indicates one or more criterions for matching one or more fields 82-88 of the log entries 80. The one or more criterions can be specified in the same or similar manner as with the filter nodes described above. For example, one criterion may be that the category 86 matches a specified string (e.g., "malicious"). Another criterion may be that the group 85 matches a specified string (e.g., "student"). Criterions may be combined. The aggregate node then, for each received packet, updates a data file with the running count of log entries that meet the specified criteria. Running counts may be recorded over a specified period and with time or date stamps, so as to track historic statistical request data.

In some embodiments, the aggregate node is configured to discard received packets, so that the calculated aggregated data is the only data stored. In other embodiments, the aggregate node is configured to store log entries in the same manner as the store node described above. In the latter case, data files generated by the aggregate node supplement the log entry files.

The aggregate node is configured to not report packet failures and always reports success. The aggregate node does not have a node failure state and will always report as operational.

The aggregate node has one upstream neighbouring node and has no downstream neighbouring nodes.

A null node is an endpoint node that does nothing. Packets that arrive at a null node are discarded. The null node is configured to not report packet failures and always reports success. The null node does not have a node failure state and will always report as operational. The null node can have one or more upstream neighbouring node and has no downstream neighbouring nodes.

Figure 13:
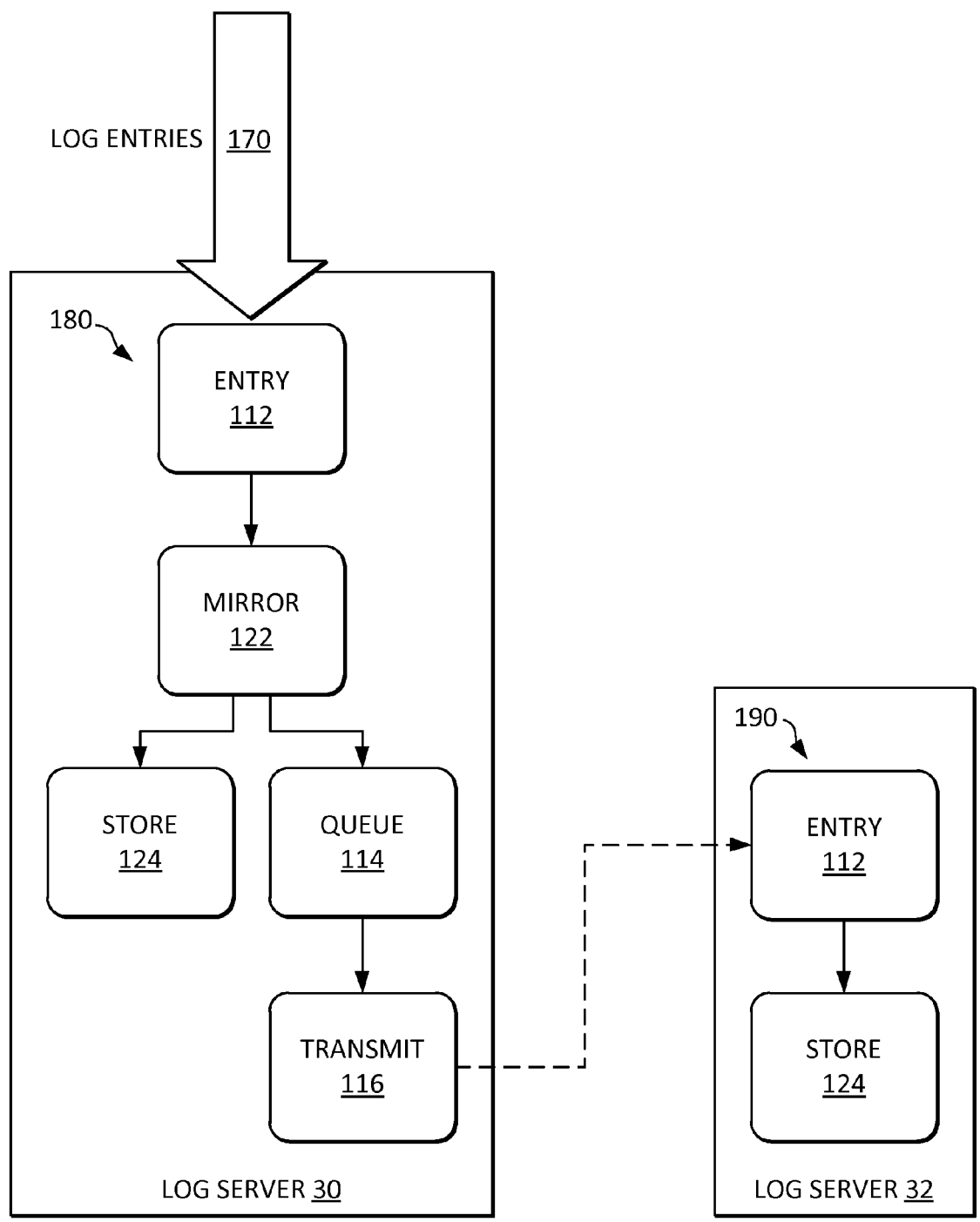
FIG. 13 is a diagram of two graph structures on two geographically remote servers for redundant storage of log entries.

As mentioned above, any number of log servers 30, 32, 34 can be provided with any number of graph structures, as the following example illustrates. Referring to FIG. 13 two graph structures are shown as implemented on two of the log servers 30, 32.

In this example, the log server 30 is geographically local to the policy service 48 (FIG. 1), while the log server 32 is geographically remote to the policy service 48. Remote can be defined as located at different physical facility far enough away so as to not be subject to the same general physical security threats (e.g., fire, unauthorized building access, earthquake, etc.). In one example, remote is greater than 1 km. In another example, remote is greater than 100 km.

The policy service 48 is configured to send packets of log entries 170 to the log server 30.

The log server 30 includes a graph structure 180 that receives packets 170 at an entry node 112 (which may be termed a local entry node), copies the received packets at a mirror node 122, stores one copy of the packets 170 at a store node 124, and sends the other copy of the packets 170 to a queue node 114 ahead of a transmit node 116 that designates the remote server 32.

The remote log server 32 includes a graph structure 190 that has an entry node 112 configured to receive packets 170 from the transmit node 116 of the graph structure 180 of the server 30. Such an entry node 112 may be referred to as a remote entry node. After receiving packets 170, the graph structure 190 stores packets 170 at a store node 124.

The graph structures 180, 190 as implemented on log servers 30, 32 at different locations advantageously realize log redundancy in a manner that is readily configurable and deployable.

In another embodiment, the graph structure 180 is provided at the policy service 48, such as at the policy server 24, and the graph structure 190 is provided at the remote server 32.

Configuring graphs structures can be achieved by instantiating nodes, making connections, and specifying node settings (also termed parameters). This can be performed using a configuration file 200, as shown in FIG. 14. Such a configuration file can be provided to each server 30, 32, 34 that implements a graph structure. A program 100 on the server 30, 32, 34 can be configured to interpret the configuration file 200 and perform the operational functionality defined by the graph structure or structures set out therein.

The configuration file 200 includes node instantiation statements 202, node connection statements 204, and node setting statements 206.

Node instantiation statements 202 can take the form of node type followed by a unique node name. For example, the statement "entry my_entry_point" can instantiate an entry node with the name "my_entry_point".

Node connection statements 204 can include a connection keyword (e.g., "connect") followed by the names of two node instances to connect, with the upstream node listed first (e.g., "connect my_entry_point my_temp_queue").

Node setting statements 206 identify an instantiated node by name, a setting keyword, and a setting value. Nodes may be objects and an operator (e.g., "->") may be used between the node name and the setting keywords, as is known in object-oriented programming to indicate the property, method, etc of an object. For example the statement "my_temp_queue->file_path/tmp/" sets the file path setting of the instance of the queue node named "my_temp_queue" to the path "/tmp/".

The example configuration file 200 shown in FIG. 14 implements an instance of the graph structure 110 of FIG. 7.

Figure 15:
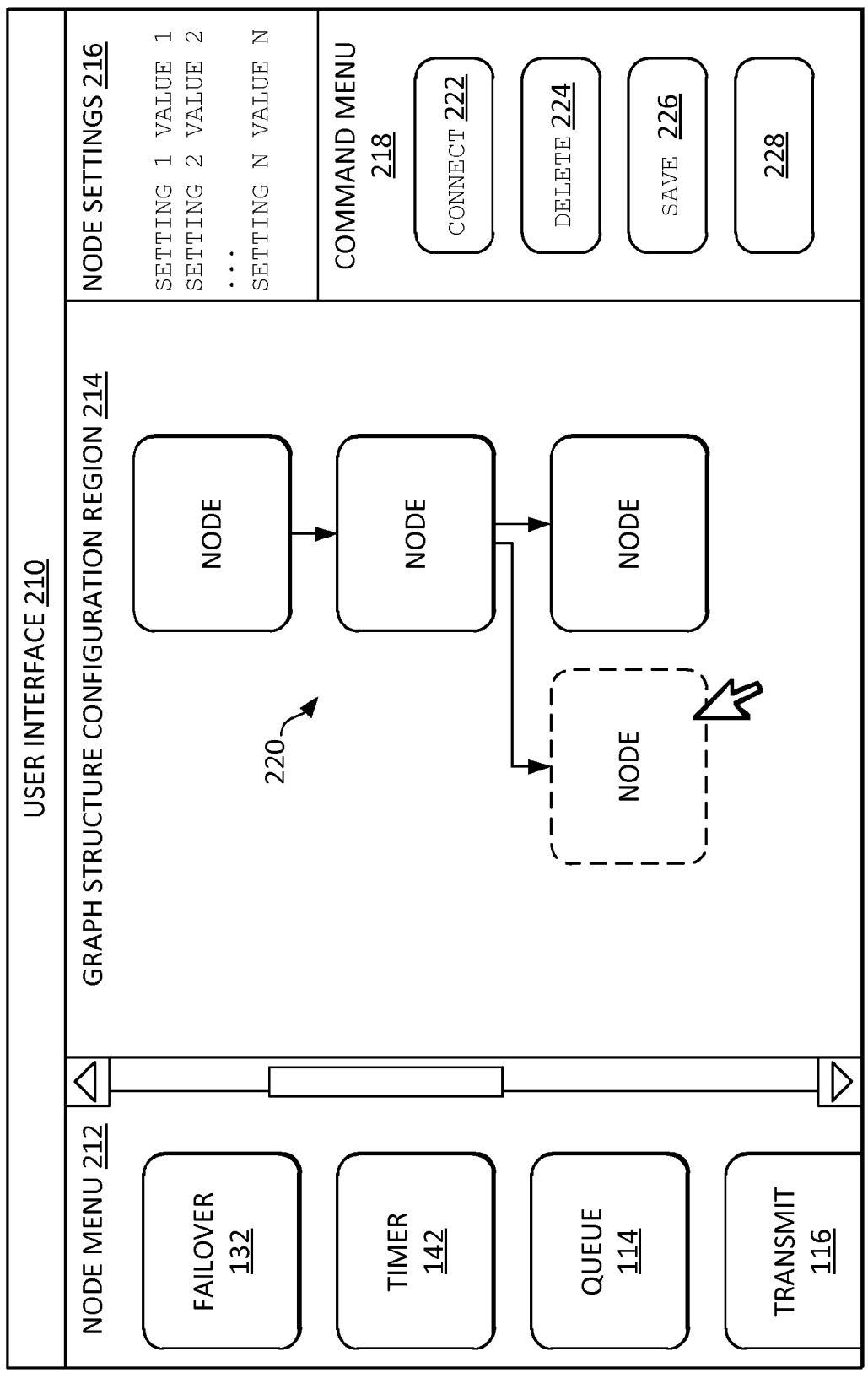
FIG. 15 diagram of a graphical user interface for configuring a graph structure.

FIG. 15 shows a graphical user interface (GUI) 210 configured to generate graphs structures. In some embodiments, the GUI 210 is generated by one of the servers of FIG. 1, for example the server 24, 30, 32, 34, and made available over the network to an admin computer. In other embodiments, GUI 210 is local to the log server 30, 32, 34 for which the graph structure is to be generated. Output of the GUI 210 can include a configuration file, such as the configuration file 200 of FIG. 14.

The GUI 210 includes a node menu 212, a graph structure configuration region 214, a node settings region 216, and a command menu 218.

The node menu 212 is configured to list types of nodes that can be added to the graph structure under construction 220. Such a list can be textual, icon-based, or of other form.

The graph structure configuration region 214 is a workspace where the graph structure under construction 220 is arranged and assembled from nodes selected from the node menu 212. A pointing device (e.g., mouse) can be used to select and arrange nodes.

The node settings region 216 is configured to list the settings for a node selected of the graph structure under construction 220. The settings can then be provided with values via text entry or another manner.

The command menu 218 includes buttons 222-228 or other user interface elements configured to connect selected nodes, at 222, delete a selected node, at 224, save the graph structure under construction 220, at 226, and provide other functions, at 228.

One of the advantages of the configurable graph structures described herein is that large amounts of log data can be processed quickly and efficiently. Moreover, configuring or updating the configurations of the graph structures that define the logging service allows for relatively quick and simple deployment and maintenance of a geographically distributed and scalable logging service.

While the foregoing provides certain non-limiting example embodiments, it should be understood that combinations, subsets, and variations of the foregoing are contemplated. The monopoly sought is defined by the claims.

The invention claimed is:

1. A policy service logging system comprising:
one or more servers connected by a network, the one or more servers configured to provide a graph structure comprising a plurality of nodes, each node in communication with at least one other node;
the graph structure configured to process log entries of network resource requests subject to policy implemented by a policy service, each log entry recording at least a uniform resource locator (URL) of a content request made by a requesting computer and processed by the policy service, each log entry further recording an identity associated with the requesting computer, flow of log entries through the graph structure progressing from an upstream node to a downstream node; and
the nodes configured to perform operations on the log entries, each node defining a discrete element of operational behavior for the graph structure, each node taking a log entry as input and providing at least the same log entry as output, the plurality of nodes configurable within the graph structure to define customizable policy service logging using corresponding discrete elements of operational behavior, the plurality of nodes including at least one entry node configured to receive log entries from the policy service, and the plurality of nodes further including at least one store node located in the graph structure downstream of the entry node and configured to store in long-term storage the same log entries received by the entry node for future reference.

2. The system of claim 1, wherein a queue node is configured to perform a queuing operation to receive and temporarily store log entries according to a first-in, first-out process.

3. The system of claim 1, wherein at least two store nodes are provided by at least two of the servers that are physically remote from one other.

4. The system of claim 1, wherein a transmit node is configured to transmit log entries to a remote host.

5. The system of claim 1, wherein a mirror node is configured to copy log entries to two or more directly downstream nodes.

6. The system of claim 1, wherein a failover node is configured to route log entries to two or more directly downstream nodes according to priority and availability of the two or more directly downstream nodes.

7. The system of claim 1, wherein a timer node is configured to forward log entries during a selected window of time.

8. The system of claim 1, wherein a hash node is configured to route log entries to two or more directly downstream nodes according to a hash of selected information of the log entries.

9. The system of claim 1, wherein a filter node is configured to route log entries to two or more directly downstream nodes according to a selected criterion applied to the log entries.

10. The system of claim 1, wherein an aggregate node is configured to determine aggregate data from log entries and store the aggregate data in long-term storage.

11. The system of claim 10, wherein the aggregate node is configured to discard log entries after determining the aggregate data.

12. The system of claim 1, wherein the graph structure is configured to process log entries in packets of one or more log entries.

13. The system of claim 1, wherein each log entry further comprises two or more of a requestor's Internet protocol (IP) address, a requesting user's username, a category of content, and a policy decision.

14. The system of claim 1, further comprising a graphical user interface (GUI) configured to allow selection and arrangement of nodes in the graph structure.

15. The system of claim 1, wherein the plurality of nodes are configured to report failure through the graph structure in an upstream direction from the downstream node to the upstream node and opposite the flow of log entries through the graph structure.

16. A policy service logging system comprising:
one or more servers connected by a network, the one or more servers configured to provide a graph structure comprising a plurality of nodes, each node in communication with at least one other node;
the graph structure configured to process log entries of historic network resource requests subject to policy implemented by a policy service, each log entry recording at least a uniform resource locator (URL) of a historic content request made by a requesting computer and processed by the policy service, each log entry further recording an identity associated with the requesting computer, flow of log entries through the graph structure progressing from an upstream node to a downstream node;
each node defining a discrete element of operational behavior for the graph structure, each node taking a log entry as input and providing at least the same log entry as output, the plurality of nodes configurable within the graph structure to define customizable policy service logging using corresponding discrete elements of operational behavior; and
the plurality of nodes comprising an entry node configured receive log entries from the policy service and at least one endpoint node downstream of the entry node, the endpoint node being one of a transmit node configured to transmit the same log entries received by the entry node to a remote host and a store node configured to store in long-term storage the same log entries received by the entry node for future reference.

17. The system of claim 16, wherein the plurality of nodes further comprises at least one intermediate point connected between the entry node and the endpoint node, the at least one intermediate point selected from the group consisting of:
a queue node configured to perform a queuing operation to receive and temporarily store log entries;
a mirror node configured to copy long entries to two or more directly downstream nodes;
a failover node configured to route log entries to two or more directly downstream nodes;
a timer node configured to forward log entries downstream during a selected window of time;
a hash node configured to route log entries to two or more directly downstream nodes according to a hash of selected information of the log entries;
a filter node configured to route log entries to two or more directly downstream nodes according to a selected criterion applied to the log entries; and
an aggregate node configured to determine aggregate data from log entries and store the aggregate data.

18. The system of claim 17, wherein the graph structure is configured to process log entries in packets of one or more log entries.

19. The system of claim 16, wherein the plurality of nodes are configured to report failure through the graph structure in an upstream direction from the downstream node to the upstream node and opposite the flow of log entries through the graph structure.

20. A method of processing log entries of a policy service, the method comprising:
performing operations defined by a graph structure on packets of log entries of historic network resource requests subject to policy implemented by a policy service, the graph structure defined by a plurality of connected nodes that are each configured to perform a discrete operation on the packets of log entries, the plurality of nodes configurable within the graph structure to define customizable policy service logging using corresponding discrete operations, each node taking a log entry as input and providing at least the same log entry as output, each log entry recording at least a uniform resource locator (URL) of a historic content request made by a requesting computer and processed by the policy service, each log entry further recording an identity associated with the requesting computer, the plurality of nodes including at least one entry node configured to receive log entries from the policy service, and the plurality of nodes further including at least one store node located in the graph structure downstream of the entry node; and the store node storing for future reference the same log entries received at the entry node at a long-term storage location that is selected as a result of the performed operations.

21. The method of claim 20, further comprising reporting failure of a packet of log entires or a node through the graph structure in an upstream direction from the downstream node to the upstream node and opposite the flow of log entries through the graph structure.

* * * * *